United States Patent
Stephens

(10) Patent No.: US 6,176,314 B1
(45) Date of Patent: Jan. 23, 2001

(54) LOW DENSITY WELL CEMENT COMPOSITIONS AND METHOD OF USE

(75) Inventor: Michael Stephens, Bartlesville, OK (US)

(73) Assignee: Phillips Petroleum Company, Bartlesville, OK (US)

( * ) Notice: Under 35 U.S.C. 154(b), the term of this patent shall be extended for 0 days.

(21) Appl. No.: 09/353,841

(22) Filed: Jul. 15, 1999

(51) Int. Cl.$^7$ ................................................. E21B 33/13
(52) U.S. Cl. ........................................... 166/293; 507/216
(58) Field of Search .................................. 166/292, 293, 166/294, 295; 106/720, 719, 724; 507/216

(56) References Cited

U.S. PATENT DOCUMENTS

| | | | |
|---|---|---|---|
| 3,762,937 | * 10/1973 | Schupack | 106/726 |
| 3,804,174 | * 4/1974 | Chatterji et al. | 166/293 |
| 3,845,822 | 11/1974 | Clampitt et al. | 166/281 |
| 3,959,003 | * 5/1976 | Ostroot et al. | 106/720 |
| 4,118,241 | * 10/1978 | Bernett | 524/4 |
| 4,340,427 | 7/1982 | Sutton | 106/641 |
| 4,419,135 | 12/1983 | Hoge | 106/678 |
| 4,462,837 | * 7/1984 | Baker et al. | 106/720 |
| 4,470,463 | * 9/1984 | Holland | 166/293 |
| 4,524,828 | * 6/1985 | Sabins et al. | 166/293 |
| 4,557,763 | * 12/1985 | George et al. | 106/706 |
| 4,569,395 | 2/1986 | Carpenter | 166/293 |
| 4,582,139 | * 4/1986 | Childs et al. | 166/293 |
| 4,587,283 | 5/1986 | Hille et al. | 524/3 |
| 4,662,943 | * 5/1987 | Baket et al. | 106/720 |
| 4,738,897 | 4/1988 | McDougall et al. | 428/402 |
| 4,778,529 | 10/1988 | Barker et al. | 106/93 |
| 4,784,693 | * 11/1988 | Kirkland et al. | 106/730 |
| 5,004,506 | 4/1991 | Allen et al. | 106/729 |
| 5,038,863 | * 8/1991 | Bloys et al. | 166/291 |
| 5,049,288 | 9/1991 | Brothers et al. | 524/5 |
| 5,105,885 | 4/1992 | Bray et al. | 166/279 |
| 5,113,943 | 5/1992 | Wilson et al. | 166/291 |
| 5,151,131 | 9/1992 | Burkhalter et al. | 106/822 |
| 5,229,019 | * 7/1993 | Forrest | 106/406 |
| 5,293,938 | 3/1994 | Onan et al. | 166/293 |
| 5,298,070 | 3/1994 | Cowan | 106/724 |
| 5,336,316 | 8/1994 | Dawson et al. | 106/724 |
| 5,389,706 | 2/1995 | Heathman et al. | 524/5 |
| 5,501,275 | 3/1996 | Card et al. | 166/280 |
| 5,547,506 | 8/1996 | Rae et al. | 106/730 |
| 5,588,488 | 12/1996 | Vijn et al. | 166/293 |
| 5,588,489 | * 12/1996 | Chatterji et al. | 166/293 |
| 5,613,558 | 3/1997 | Dillenbeck, III | 166/293 |
| 5,658,380 | 8/1997 | Dillenbeck, III | 106/823 |
| 5,679,731 | 10/1997 | Rodriguez | 524/5 |
| 5,688,844 | 11/1997 | Chatterji et al. | 524/8 |
| 5,820,670 | 10/1998 | Chatterji et al. | 106/727 |
| 5,866,517 | * 2/1999 | Carpenter et al. | 507/226 |

* cited by examiner

*Primary Examiner*—David Bagnell
*Assistant Examiner*—Jennifer Dougherty
(74) *Attorney, Agent, or Firm*—Gary L. Haag

(57) ABSTRACT

Method to cement a well using low density well cement slurry compositions that are formed by the addition of a free-fluid inhibitor additive to a mixture comprising a hydraulic cement and water. Suitable free-fluid inhibitors are hydroxy ethyl cellulose polymers having a cps value in the range of from about 5000 to about 50,000.

9 Claims, No Drawings

LOW DENSITY WELL CEMENT COMPOSITIONS AND METHOD OF USE

This invention relates to improved low density cement slurry compositions and the use of same in the cementing of subterranean wells.

BACKGROUND OF THE INVENTION

Hydraulic cements are cements that can set under water. This setting property serves a variety of purposes. Hydraulic cements are often used in placement of pipes or casings within a well bore of a subterranean formation for the construction of oil and gas wells. In the oil and gas industry, successful cementing of well pipe and casing during oil and gas well completion sometimes requires cement slurries which need to be of a density that is much lower than that which the cement was originally designed for by the cement manufacturer. To achieve such low densities, there is often employed the addition of large amounts of water to the existing slurry. The amount of mixing water utilized is dependent upon the desired ultimate density for the slurry as well as the API classification of the cement. However, when the addition of mixing water is employed for lowering the density of the water-cement slurry, there is experienced a detrimental effect on several properties of the resulting slurry including that of an increase of free fluid.

Thus, there exists a need in the hydraulic cementing industry for an improved well cementing composition which will provide a desired low density system while avoiding the problem of free fluid formation.

It is thus an object of the present invention to provide a novel low density well-cement slurry system which is essentially free of the problem of free fluid formation.

Another object of this invention is to provide an improved system for the cementing of subterranean wells.

Other aspects, objects and the several advantages of this invention will be apparent from the following specification and appended claims.

SUMMARY OF THE INVENTION

In accordance with one embodiment of the present invention, it has been discovered that in the production of low density slurries through the addition of additional mixing water to a cement-water slurry mix that the addition to such a slurry system of a free-liquid inhibitor results in an improved low density slurry which avoids the problem of free fluid increase which is otherwise experienced.

The term "free fluid" as used herein is intended to mean that free liquid or water which is the supernatant fluid formed on top of the slurry column which provides an indication of the amount of settling of the cement particles during slurry placement. Excessive free water on top of the cement column will result in an incompetent zone close to the top of the liner, the pipe or the casing which will have to be remedied with an expensive squeeze job.

The term "free-fluid inhibitor" employed herein is intended to define a hydroxy ethyl cellulose composition which has a solution viscosity value as measured by a Brookfield LVT viscometer in the range of from about 5000 to about 50,000 cps.

Thus, by the present invention there is provided a novel low density cement slurry composition which comprises (a) a hydraulic cement, (b) water, and (c) a free-fluid inhibitor wherein said composition has a density in the range of about 11.0 pounds per gallon of slurry to about 15.0 pounds per gallon of slurry and said free-fluid inhibitor is present in an amount sufficient to essentially preclude the development of free fluid in the slurry.

The term "low density cement slurry" as employed herein is intended to mean a cement-water slurry having a density in the range of from about 11.0 to 15.0 pounds per gallon of slurry.

In another aspect of this invention, there is provided an improved process for the cementing of subterranean wells with a low density cement slurry through the use of these novel low density slurry compositions which avoid the development of undesirable free fluid in the system.

DETAILED DESCRIPTION OF THE INVENTION

The present invention relates to improved low density cementing composition and the method of using such low density cementing compositions.

The cementing compositions of this invention are comprised of a hydraulic cement, water and a free-fluid inhibitor additive which is present in an amount sufficient to preclude the development of free liquid in the cementing composition.

In this disclosure, the term "hydraulic cement" refers to any inorganic cement that hardens or sets with water. Hydraulic cements, for instance, include Portland cement, aluminous cements, pozzolan cements and the like. Thus, for example, any of the class A–H and J cements as listed in the API spec 10 First Edition, January 1982 are suitable for the invention.

Mixing water with the dry hydraulic cement compositions produces a slurry. A sufficient amount of water should be added to the hydraulic cement to form a pumpable slurry of the desired density. The water can be of any type water commonly used in the cement industry, such as fresh water, brines, sea water and the like.

If desired, the slurry composition can also have additional additives therein either formed by dry blending with the cement or added to the water used in forming the slurry. Such additives can be one selected from the group consisting of dispersants, accelerators, viscosifiers, retarders, extenders and foaming agents.

Examples of suitable dispersants are those selected from the group consisting of formaldehyde condensation products of naphthalene sulfonic acid, melamine sulfonic acid, ketone sulfonic acid, naphthol sulfonic acid and the alkali earth metal salts thereof Such dispersants can be used in an amount in the range of from about 0.1 to about 2.0 percent by weight of cement (BWOC).

Examples of suitable accelerators are those selected from the group consisting of calcium chloride, potassium chloride, sodium chloride, calcium nitrate, potassium nitrate and sodium nitrate. Such accelerators can be used in an amount in the range of from about 1 percent by weight of mixing water (BWOW) to saturation.

Examples of suitable viscosifiers are those selected from the group consisting of xanthan gum, guar gum and derivatives thereof, homo and copolymers of acrylamide, N-vinyl pyrrolidone, 2 acrylamide-3-methyl propane sulfonic acid, alkali metal salts thereof, N-vinyl acetamide, N-vinyl-N-methyl acetamide, N-N-dimethyl acrylamide, acrylic acid, itaconic acid and alkali earth metal salts thereof. Such viscosifiers can be used at concentrations in the range of about 0.1 to about 5.0 percent by weight of cement.

Examples of suitable retarders are those selected from the group consisting of lignosulfonic acid, hydroxy-basic acids, tannic acids, boric acid, polysaccharides, condensation and chain polymerization polymers, alkali earth metal salts thereof, zinc oxide, iron oxide and ferochrome lignosulfonate. Such retarders can be used at concentrations in the range of about 0.1 to about 10 percent by weight of cement.

Examples of suitable extenders are those selected from the group consisting of calcium sulfate, sodium and aluminum silicates, fly ash, bentonite, diatomite, filmed silica, ceramic beads, attapulgite, gilsonite, polystyrene foam beads, aluminum chlorohydrate, silica spheres and nitrogen gas. Such extenders can be used at concentrations in the range of from about 0.1 to about 75.0 percent by weight of cement.

Examples of suitable loss circulation agents are those selected from the group consisting of cellophane flakes, sized silica, ground rubber, seed hulls, saw dust, paper flakes, calcium carbonate, ground coal and fused coal. Such loss circulation agents can be used at concentrations in the range of from about 0.1 to about 20 percent by weight of cement.

Examples of suitable foaming agents are those selected from the group consisting of ethoxylated alcohols, alkylsulfonates, polyolefin sulfonates, alkyl alkene sulfonates, alkyl amine, fatty acid esters and petroleum sulfonates, Such foaming agents can be used at concentrations in the range of about 0.1 to about 5.0 percent.

When deemed appropriate, the slurries of this invention can have incorporated therein a gas such as nitrogen or carbon dioxide.

API Spec 10 First Edition, January, 1982, which is known to the cement industry, described as approved apparatus and method for measuring the consistency of cement slurries in terms of Bearden units of consistency (Bc). A pumpable low density slurry in accordance with the present invention should be one that is in the range of from about 0.1 to about 30.0, preferably in the range of from about 5.0 to about 20 Bearden units of consistency.

Hydraulic cements which can be employed in the novel slurries of the present invention are those selected from the groups of those cements having an API classification A, B, C, D, E, F, G and H, ASTM type cements I, II, III, IV and V, pozzolanic cements, pozzolan-like cements, gypsum cements, API classification, expanding cements K and M, calcium aluminate cements and slag cements.

The cementing slurry compositions of this invention also contain a free-fluid inhibitor additive which is present in an amount such that the free-fluid is essentially precluded in the formulated low density cement slurry.

In general, in the practice of this invention, the free-fluid inhibitor additive is present in the low density cement slurry in an amount in the range of from about 0.1 to about 2.0 weight percent based on the weight of the cement employed.

Suitable free-fluid inhibitor additives for use in the practice of the present invention is any hydroxy ethyl cellulose composition having a solution viscosity value in the range of from about 5000 to about 50,000 cps.

The final composition of the low density slurries of the present invention will be dependent on the nature of the hydraulic cement employed, the amount of water required to establish the desired low density, and the selection of optional additives, if any, in addition to the presence of the free-fluid inhibitor additive.

In general, the slurry composition of this invention will have present therein a hydraulic cement and from about 53 to about 180 weight percent water and from about 0.1 to about 2.0 weight percent of free-fluid inhibitor additive based on the weight of cement.

The following examples are intended to be illustrative of the present invention and to teach one of ordinary skill in the art to make and use the invention. These examples are not intended to limit the invention in any way.

EXAMPLE I

To measure the Brookfield Viscosity value of a series of hydroxy ethyl cellulose polymers to determine those which would be suitable for the formation of a low density cement slurry essentially free of free-liquid, a series of hydroxy ethyl cellulose polymers of varying molecular weights obtained from Aqualon Corporation were subjected to evaluation in a solvent system consisting of deionized water and sodium silicate.

The solvent system was prepared admixing 1921.04 grams of deionized water and 127.636 grams of 40 Be sodium silicate. The resulting solution had a pH of 11.17.

To 392 gram aliquots of solution in a Warring blender was added 8 grams of hydroxy ethyl cellulose polymer while operating the blender at 4000 rpm. After completion of the mixing of each polymer and solvent, the resulting solution was placed into a 500 ml plastic bottle and sealed with a lid. Each of the four solutions were placed in a water bath preset to 80° F. and allowed to stand for two hours.

To measure the Brookfield Viscosity, each of the prepared solutions were separately added after the two hour standing period to a Brookfield viscosimeter to be measured at 6 rpm with a LV3 spindle after 1 minute at 6 rpm. ASTM method D2196—Standard Test Methods for Rheological Properties of Non-Newtoniam Materials by Rotational (Brookfield) Viscometer.

The following results were obtained:

| Solution | Polymer Type | Bfm (cps) |
| --- | --- | --- |
| A | 250 GXR | 400 |
| B | 250 EXR | 200 |
| C | 250 MBR | 13,700 |
| D | 210 HHW | +20,000 |

EXAMPLE II

The four hydroxy ethyl cellulose polymers as employed in Example I were evaluated for free-fluid inhibition as follows.

A 12.5 pound per gallon cement slurry consisting of 400 grams of API class H cement, 3.3 grams of each of the polymers A, B, C and D and 416.8 grams of fresh water were prepared by mixing in a Warring blender for 15 seconds at 4000 rpm and then for an additional 35 seconds at 12,000 rpm.

The resulting slurries were then aged in an atmospheric consistometer for 20 minutes at 80° F. The aged slurries were then individually transferred to a Warring blender and remixed for an additional 35 seconds at 12,000 rpm. Thereafter, 250 mls of each slurry were transferred into a 250 ml graduated cylinder and sealed with a plastic film wrap to prevent evaporation. The graduated cylinders were then placed at an angle of inclination of 45° and allowed to stand quiescent for 2 hours. After 2 hours, the free fluid was measured.

The following results were obtained:

| HEC Sample | Test Temperature, °F. | ml Free Fluid per 250 ml |
|---|---|---|
| A | 80 | 83 |
| B | 80 | 64 |
| C | 80 | 0 |
| D | 80 | 0 |

The above data indicates that the polymer samples C and D having a cps value of 13,700 and +20,000 provided a slurry system which retained their fluidity while the samples A and B did not.

In addition, the above data demonstrates that solution characteristics of the four hydroxy ethyl cellulose samples of Example I can be used to correlate their effectiveness as free-fluid inhibitors.

The specific examples herein are to be considered primarily illustrative. Various changes beyond those described will no doubt occur to those skilled in the art and such changes are to be understood as forming a part of this invention insofar as they fall within the spirit and scope of the appended claims.

That which is claimed is:

1. A process for the preclusion of free-liquid in the cementing of a subterranean well which comprises cementing said subterranean well with a low density cement slurry composition which comprises (a) a hydraulic cement, (b) water and (c) a free-liquid inhibitor wherein said composition has a density in the range of from about 11.0 pounds per gallon of slurry to about 15.0 pounds per gallon of slurry, wherein said free-liquid inhibitor is hydroxy ethyl cellulose having a cps value, measured as hydroxy ethyl cellulose dissolved in aqueous sodium silicate solution, in the range of about 5000 to about 50,000 and wherein said free liquid inhibitor is present in an amount sufficient to preclude the development of free-liquid in the slurry.

2. A process according to claim 1 wherein said free-liquid inhibitor is present in an amount in the range of about 0.1 to about 2.0 weight percent based on the weight of cement.

3. A process according to claim 1 wherein said composition is comprised of a hydraulic cement and from about 50 to about 180 weight percent water and from about 0.1 to about 2.0 weight percent of free-liquid inhibitor based on the weight of cement.

4. A process for the preclusion of free-liquid in the cementing of a subterranean well which comprises cementing said subterranean well with a low density cement slurry composition consisting essentially of: (a) a hydraulic cement, (b) water and (c) a free-liquid inhibitor wherein said composition has a density in the range of from about 11.0 pounds per gallon of slurry to about 15.0 pounds per gallon of slurry, wherein said free-liquid inhibitor is hydroxy ethyl cellulose having a cps value, measured as hydroxy ethyl cellulose dissolved in aqueous sodium silicate solution, in the range of about 5000 to about 50,000 and wherein said free-liquid inhibitor is present in an amount sufficient to preclude the development of free-liquid in the slurry.

5. A process according to claim 4 wherein said free-liquid inhibitor is present in an amount in the range of about 0.1 to about 2.0 weight percent based on the weight of cement.

6. A process according to claim 4 wherein said composition based on the weight of cement is from about 50 to about 180 weight percent water and from about 0.1 to about 2.0 weight percent free-liquid inhibitor.

7. A process for the preclusion of free-liquid in the cementing of a subterranean well which comprises cementing said subterranean well with a low density cement slurry composition consisting essentially of: (a) a hydraulic cement, (b) water, (c) a free-liquid inhibitor wherein said composition has a density in the range of from about 11.0 pounds per gallon of slurry to about 15.0 pounds per gallon of slurry, wherein said free-liquid inhibitor is hydroxy ethyl cellulose having a cps value, measured as hydroxy ethyl cellulose dissolved in aqueous sodium silicate solution, in the range of about 5000 to about 50,000 and wherein said free-liquid inhibitor is present in an amount sufficient to preclude the development of free-liquid in the slurry and (d) one or more components selected from the group consisting of dispersants, accelerators, viscosifiers, retarders, extenders and foaming agents.

8. A process according to claim 7 wherein said free-liquid inhibitor is present in an amount in the range of about 0.1 to about 2.0 weight percent based on the weight of cement.

9. A process according to claim 7 wherein said composition based on the weight of cement is from about 50 to about 180 weight percent water and from about 0.1 to about 2.0 weight percent free-liquid inhibitor.

* * * * *